May 17, 1955

M. LONG ET AL 2,708,287

PATTY FORMER

Filed July 9, 1952

INVENTORS.
Marshall Long
Jack W. Miller
Charles F. Rapp

BY

ATTORNEY.

INVENTOR.
Marshall Long
Jack W. Miller
Charles F. Rapp
BY
ATTORNEY

May 17, 1955     M. LONG ET AL     2,708,287
PATTY FORMER
Filed July 9, 1952     3 Sheets-Sheet 3
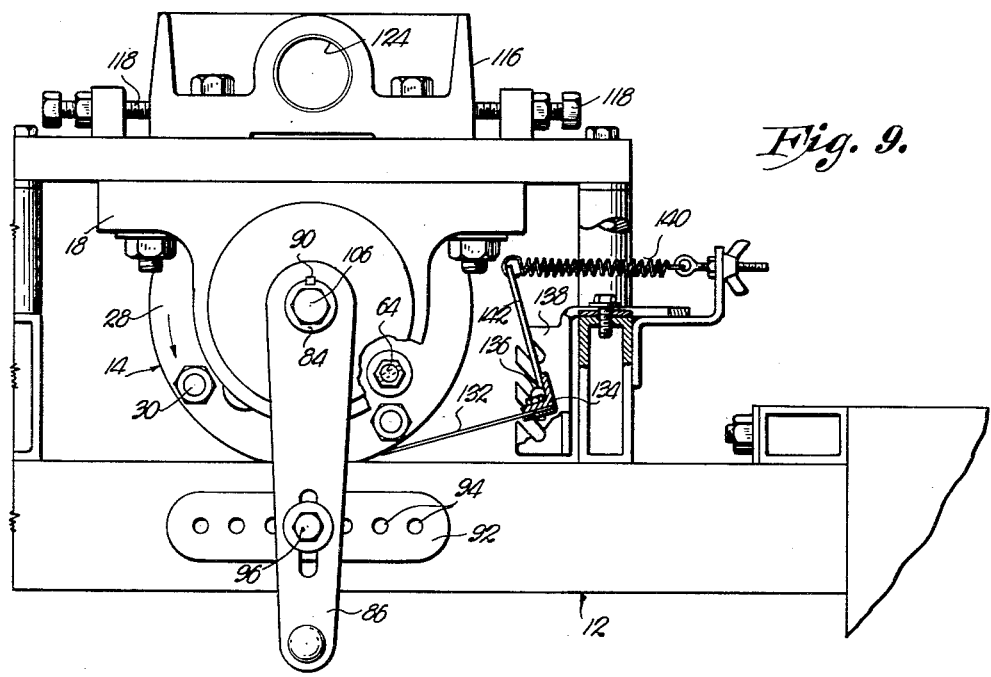
Fig. 9.
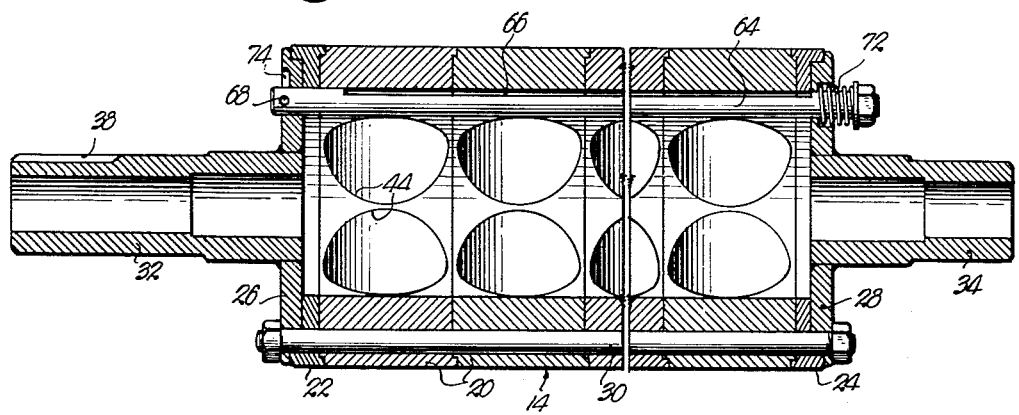
Fig. 11.
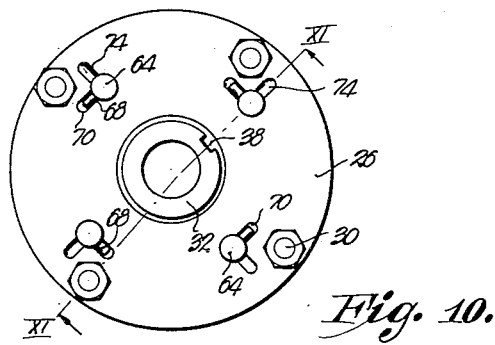
Fig. 10.
INVENTOR.
Marshall Long
Jack W. Miller
Charles F. Rapp
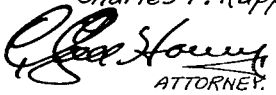
ATTORNEY.

United States Patent Office 2,708,287
Patented May 17, 1955

2,708,287

PATTY FORMER

Marshall Long, Overland Park, Kans., and Jack M. Miller and Charles F. Rapp, Kansas City, Mo., assignors, by mesne assignments, to Marlen Equipment Corporation, Overland Park, Kans., a corporation of Missouri Application July 9, 1952, Serial No. 297,912

6 Claims. (Cl. 17—32)

This invention relates to machines for automatically forming patties, and particularly food products such as meat, the primary object being to produce a preformed edible product that is easily canned or otherwise packaged, utilizing material initially in bulk form.

It is the most important object of the present invention to provide a machine adapted to receive ground meat for instance, under pressure, form the same in the shape of a relatively small disc-like patty, and eject the compressed patty into a can or other receptacle, or to a point of cooking and use or packaging as desired It is another important object of the present invention to provide automatic apparatus for the above mentioned purpose that includes a continuously rotatable tube within which is mounted a plurality of reciprocable pistons movable in one direction with respect to the tube under the force of the material forming the patties, and shiftable in the opposite direction to eject the patty through the medium of cam construction within the tube.

Another object hereof is to provide a patty former that includes a hollow manifold into which the material is forced under pressure, the manifold being provided with outlet means associated with the rotatable tube whereby the series of cylinders of the tube are successively brought into register with the outlet means of the manifold.

Another object hereof is to provide a cam assembly as above mentioned that is adjustable in a number of ways, all while the machine is in operation, for synchronizing the operation of the machine properly, and for varying the thickness of the patties as the same are ejected from the cylinders of the tube.

Other objects include the way in which the cylinders are floatingly mounted for movement in one direction under the force of the material forming the patties and for precise, positive and accurate cam operation in the opposite direction; the way in which a plurality of rows of pistons are releasably held in place and forcibly ejected by means of an actuating pin common thereto; the manner of providing a scraper blade for removing the ejected patties from the extended pistons and for shaping the patties as they are ejected; the manner of providing a sectional cam control that includes parallel motion interconnection between the sections to vary the distance therebetween; the way in which the normally stationary cam assembly is rendered rotatable on the axis of rotation of the piston supporting tube; and many other important objects, all of which will be made clear or become apparent as the following specification progresses.

In the drawings:

Fig. 9 is a fragmentary, end elevational view.

Fig. 10 is an end elevational view of the parts illustrated in Fig. 11; and

Fig. 11 is a longitudinal, cross-sectional view through the rotatable tube entirely removed from its supporting bearings and association with the manifold shown in Figs. 1 to 4 inclusive, the pistons and the cam assembly being removed from within the tube and the drive sprocket for the tube being eliminated, said section being taken on line XI—XI of Fig. 10.

Figures 1, 2:
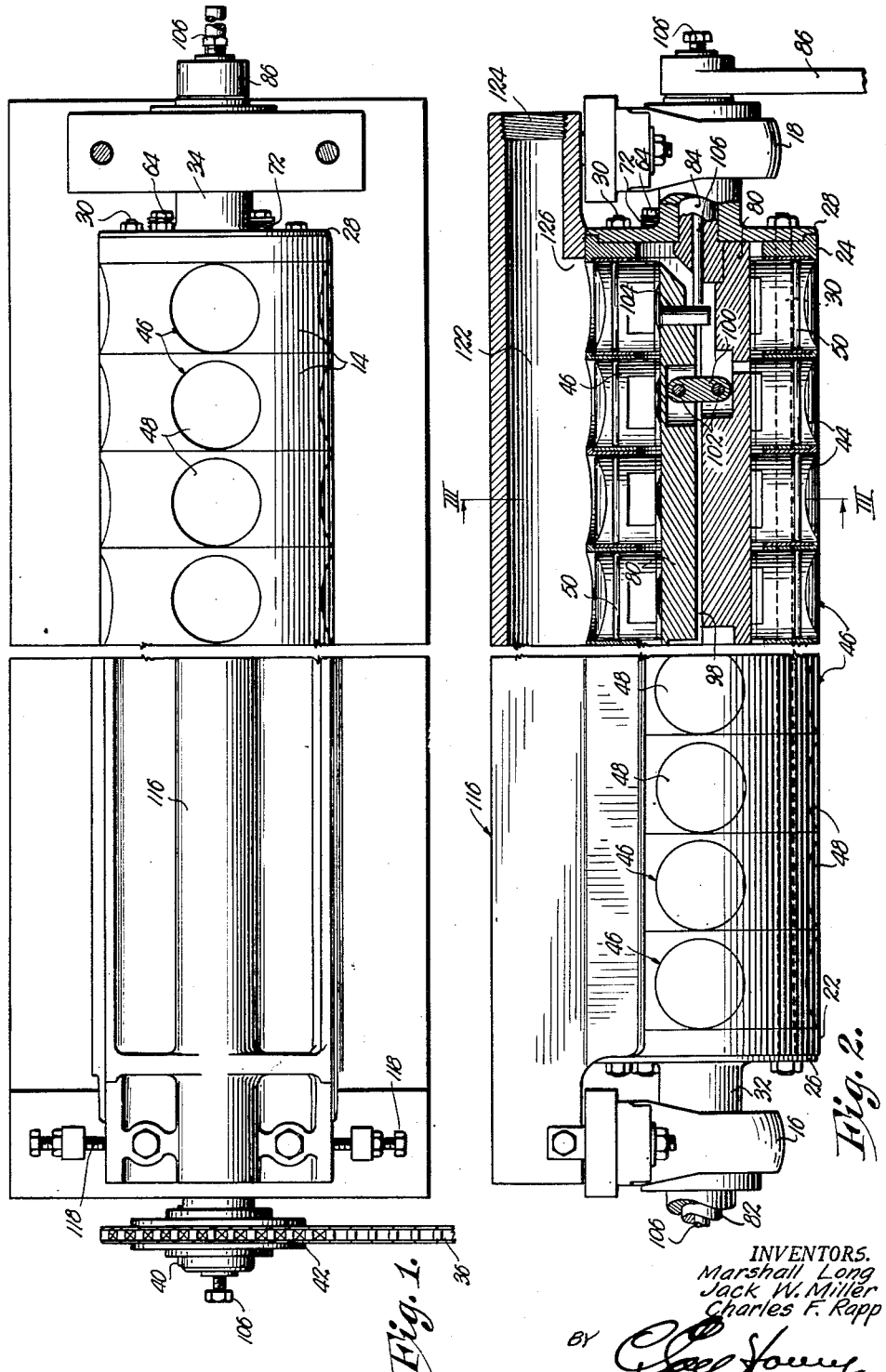
Figure 1 is a fragmentary, top plan view of a patty former made pursuant to the present invention, parts being broken away for clearness.
Fig. 2 is a fragmentary, side elevational view, parts being broken away and in section to reveal details of construction.

The structure for forcing meat products or other material forming the patties into the manifold above mentioned, forms no part of the present invention and has not been shown. Additionally, the prime mover for rotating the piston supporting tube has not been illustrated for the same may take any desired form. Except for the above, the entire patty former is illustrated in its entirety by the drawings.

The entire frame for supporting the component parts of the patty former is broadly designated by the numeral 12 in the drawings, and supports an elongated tube 14 for rotation on its longitudinal, horizontal axis by means of a pair of spaced, suspended bearings 16 and 18.

The tube 14 consists of a plurality of end-to-end annular sections 20, a pair of end sections 22 and 24, and a pair of end plates 26 and 28 interlocked by lap joints and joined by the rods 30 as illustrated most clearly in Fig. 11 of the drawings. The tube 14 may be coated or plasticized, particularly if used in the food industry to fill all pores and the joints between the sections thereof. Tubular pintles 32 and 34 connected rigidly to the plates 26 and 28 respectively, on the longitudinal axis of the tube 14, extend therebeyond in opposite directions and are received by the bearings 16 and 18 respectively, as illustrated in Figs. 1 and 2 of the drawings for free rotation therein upon energization of a prime mover, not shown, operably coupled with a continuous chain or the like 36.

A keyway 38 in the pintle 32, receives a key 40 for connecting a sprocket wheel 42 to the pintle 32, chain 36 being trained around the sprocket wheel 42 as shown in Fig. 1.

At least one of the sections 20 of the tube 14, is provided with a cylinder 44 which may be disposed at any desired angle relative to the axis of tube 14, even parallel with such axis, but preferably radially as shown. At least one row of cylinders 44 is desired but there is shown four series or aligned rows of cylinders 44 in the tube 14, with the rows spaced 90 degrees apart. There are eight sections 20 in the patty former chosen for illustration, and accordingly, there are eight cylinders 44 in each row presenting a total of 32 cylinders 44. As will hereinafter appear, a spiral arrangement of the cylinders 44 about the tube 14 may well be satisfactory.

Each cylinder 44 respectively, has a piston 46 reciprocably mounted therein, the pistons 46 being identical and all movable on the longitudinal axis of their respective cylinders 44 toward and away from the longitudinal axis of rotation of the tube 14. One piston 46 of each row thereof, is illustrated in Figs. 3 and 4 of the drawings, and for purposes of clarity, these four pistons are designated 46a, 46b, 46c and 46d.

Figure 3:
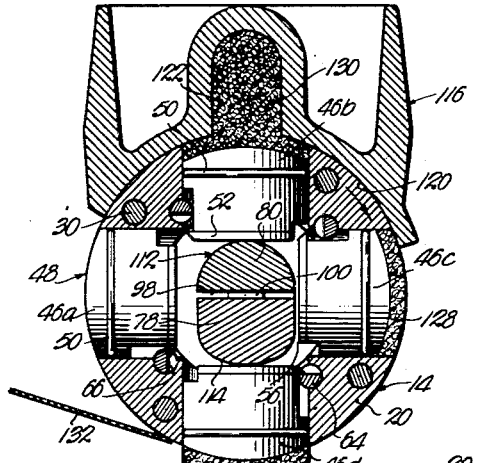
Fig. 3 is an enlarged transverse, cross-sectional view taken on line III—III of Fig. 2 showing one position of the tube and the pistons thereof.
Figure 4:
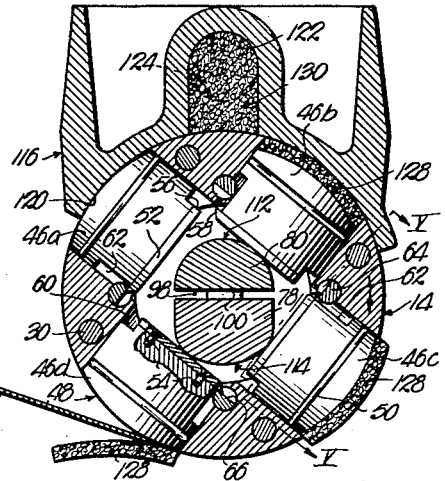
Fig. 4 is a cross-sectional view similar to Fig. 3 showing the tube and pistons in another position.
Figure 5:
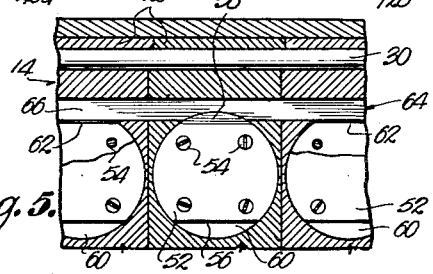
Fig. 5 is a fragmentary, detailed, cross-sectional view taken on irregular line V—V of Fig. 4.

The outermost concave face 48 of the pistons 46 conforms precisely with the outermost configuration of the cylinder 14, and is flush therewith when held in the position of piston 46d as shown in Figs. 3 and 4. A piston ring 50 preferably of resilient or soft, pliable material may be provided for each piston 46 respectively and the flat, innermost face of the pistons 46 has a substantially circular disc-like wear plate 52 releasably secured thereto by a plurality of screws 54 (see Fig. 5). Each wear plate 52 has a segment thereof cut away as shown in Fig. 5, presenting a straight chord-like edge 56. One face of the wear plate lies flatly against the piston 46 and the opposite face thereof is provided with a beveled portion 58 parallel with the edge 56. The piston 46 has a notch 60 therein adjacent the wear plate 52 and coincident with the edge 56 thereof. It is seen in Figs. 3 and 4 of the drawings that by virtue of the beveling 58, and the provision of notches 60, the pistons 46 do not interfere with each other as they reciprocate toward and away from the axis of rotation of the tube 14 during rotation of the latter.

A second diametrically opposed notch 62 in the piston 46 is slightly deeper than the notch 60 as shown in Figs. 3 and 4, and is overlapped by that portion of the plate 52 having beveled face 58.

While the pistons 46 are all floatingly mounted for reciprocation toward and away from the axis of rotation of the tube 14 within their respective cylinders 44, such reciprocable movement, particularly outwardly, is limited by elongated pins 64 which also restrain the pistons 46 against rotation on their reciprocable axes. There are four pins 64, one for each row of pistons 46 respectively, and accordingly, each pin 64 releasably holds eight pistons 46 within their respective cylinders 44. Pins 64 are longitudinally reciprocable and rotatable within the sections 20, 22 and 24 and in the end plates 26 and 28, and are disposed next adjacent their corresponding row of cylinders 44 as shown in Figs. 3 to 5, inclusive, and 11. Pins 64 are cut away substantially the entire length thereof as shown in Fig. 11, rendering the same semi-circular in cross-section as shown in Figs. 3 and 4 and presenting a flat face that cooperates with that part of the wear plate 52 overlying the notch 62 and adjacent the beveled portion 58 of the plate 52 to limit the extent of outward movement of the pistons 46. In other words, substantially one-half of the semi-circular lengths of the pins 64, normally project into the corresponding cylinders 44 and particularly into the notches 62 of the proximal pistons 46 as shown in Figs. 3 to 5 inclusive.

It is seen therefore, that rotation of the pins 64 in one direction to move the flat face 66 thereof away from the wear plate 52, withdraws the pins 64 from within the cylinders 44 and notches 62, for ejecting the pistons 46 from the cylinders 44. Each pin 64 has a lateral finger 68 that normally is held within a cavity 70 in the outermost face of end plate 26 by a spring 72 coiled about the pin 64 at the opposite end thereof and bearing against the plate 28. A second cavity 74 in the plate 26 displaced 90 degrees from the cavity 70, receives the finger 68 when the pin 64 is depressed against the action of spring 72 and rotated to a position ejecting the pistons 46.

Figure 7:
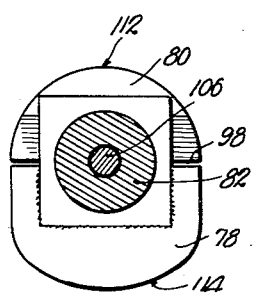
Fig. 7 is an enlarged, transverse, cross-sectional view taken on line VII—VII of Fig. 6.
Figure 8:
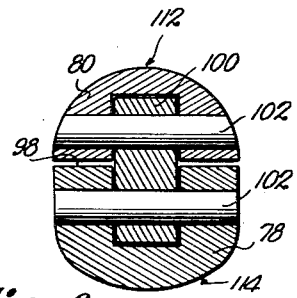
Fig. 8 is an enlarged, transverse, cross-sectional view taken on irregular line VIII—VIII of Fig. 6.

It is now apparent that all of the sections 20, 22 and 24, and plates 26 and 28 of tube 14, the two pintles 32 and 34, the thirty-two pistons 46 with their wear plates 52 and their rings 50, the four tie rods 30 and the four locking pins 64, all rotate as a unit on the longitudinal axis of the tube 14 upon applying rotative motion to the sprocket wheel 42 through endless chain 36. Such rotation is with respect to a normally stationary cam assembly broadly designated by the numeral 76 and shown in its entirety by Figs. 6 to 8 inclusive, entirely removed from within the tube 14. Cross-sectional views through the assembly 76 are presented by Figs. 3, 4, 7 and 8, and a sectional portion of Fig. 2 of the drawing shows the position of the assembly 76 within the tube 14 on the axis of rotation thereof.

Assembly 76 consists of two sections 78 and 80, the latter being shiftable radially within the tube 14 toward and away from the section 78. While the section 78 is not adapted for such radial movement, the entire assembly 76 is rotatable within the tube 14 on the axis of rotation of the latter. To this end, the section 78 is provided with a pair of opposed, tubular stems 82 and 84 extending through the tubular pintles 32 and 34 respectively, it being understood that the assembly 76 is normally held against rotation by arm 86 so that the tube 14 rotates on the stems 82 and 84 with respect thereto.

A keyway 88 in the stem 84, receives a key 90 (Figs. 6 and 9) for rigidly attaching the arm 86 to the assembly 76. A bar 92 carried by frame 12 has a plurality of openings 94 for receiving a bolt or the like 96 on the arm 86 to hold the latter in any one of a number of adjusted positions.

Figure 6:
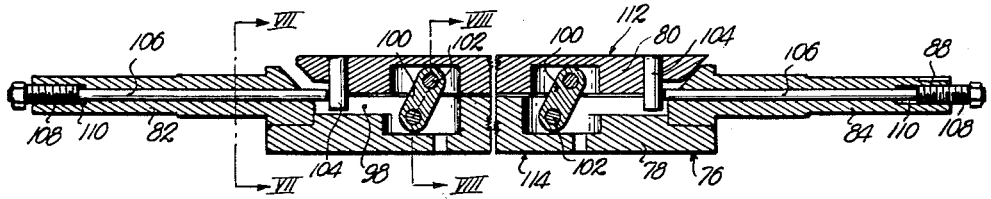
Fig. 6 is a longitudinal, vertical, cross-sectional view similar to the sectional portion of Fig. 2 through the cam assembly showing the latter entirely removed from within the rotatable tube of the machine.

The section 78 of the assembly 76, has a cavity 98 in the uppermost face thereof for receiving the section 80 and the parallel motion interconnection between the sections 78 and 80 is provided by means of a pair of short links 100 pivotally interconnecting the sections 78 and 80 by means of cross pins 102, there being recesses in both sections 78 and 80 as shown in Fig. 6, for receiving the links 100.

The section 80 has a pair of spaced pins 104 that project downwardly into the cavity 98 within the path of travel of rods 106. There is a rod 106 telescoped within each stem 82 and 84 respectively and connected therewith by means of screw threads 108 on the rods 106 meshing with tapped openings 110 in the stems 82 and 84. It is seen that both rods 106 normally bear tightly against the two pins 104 holding the same clamped therebetween and thereby maintaining a predetermined distance between the sections 78 and 80. Retraction of one rod 106 and inward movement of the other rod 106, causes the section 80 to swing with respect to the section 78, thereby varying the distance between the sections 78 and 80, and accordingly, the diameter of the assembly 76 in one direction. As shown in Figs. 3, 4, 7 and 8, assembly 76 is elliptical in transverse cross-section and it is seen that the length of the major axis thereof is varied upon manipulation of the rods 106.

Figs. 1 and 2 of the drawings illustrate the way in which the headed ends of the rods 106 project beyond the stems 82 and 84 and, accordingly, beyond the tubular pintles 32 and 34 for accessibility, whereby such adjustment of the section 80 with respect to section 78, may be made during operation and without disassembling any part of the machine. Since the elliptical portion of the cam assembly 76 extends the full length of the tube 14, it is common to all of the thirty-two pistons 46, and to this end, section 80 is provided with an uppermost and outermost arcuate cam surface 112 and the section 78 is provided with a lowermost and outermost cam surface 114 that differs slightly in configuration from the substantially semi-circular shape of the cam surface 112.

The frame 12 carries an elongated manifold broadly designated by the numeral 116, that is properly positioned by opposed pairs of adjusting screws 118 in overlying relationship to the rotatable tube 14. Manifold 116 extends the full length of the tube 14 and has an arcuate, lowermost surface 120 that conforms to the arcuate outermost face of the tube 14 as shown in Figs. 3 and 4. Manifold 116 has a longitudinal bore 122 parallel with the axis of rotation of tube 14, there being an inlet opening to the bore 122 at each end respectively of the manifold 116, one only of which is shown in Fig. 2 of the drawings, and designated by the numeral 124. There is an elongated outlet opening 126 in the lowermost face 120 of the manifold 116 communicating with the bore 122 for registration with the four rows of cylinders 44 as the same successively pass beneath the face 120 as illustrated in Fig. 3 of the drawings.

Meat products or other material to form patties 128, are designated by the numeral 130 and is forced into the bore 122 and thence into the cylinders 44, through either or both of the inlet openings 124 by means of any suitable structure coupled with the inlet openings 124 and not herein illustrated.

An elongated scraper plate 132, carried by the frame 12, and extending the entire length of the tube 14, is provided to remove the patty 128 from the surface 48 of piston 46 in the manner illustrated by Fig. 4 of the drawings. Plate 132 is mounted on a framepiece 134, provided with opposed pintles 136 that are cradled within one of a plurality of notches formed in a bracket 138 for each pintle 136 respectively, brackets 138 being secured to the frame 12. The resilient plate 132 is held biased against the outer surface of the tube 14 by means of a spring 140 connected with a lateral arm 142 on the framepiece 134.

During operation of the patty former, tube 14 is continuously rotated and the meat product or other material 130 is continuously fed into the manifold 116 under pressure. The machine therefore, needs no operator attention so far as forming the patties is concerned.

Referring now to Fig. 3 of the drawings, it is seen that piston 46a has just moved past the scraper 132 and is free to move toward and away from the axis of rotation of tube 14 as limited by its pin 64 and the assembly 76. The direction of rotation of the tube 14 is indicated by arrows in Figs. 3, 4 and 9. The piston 46b is directly beneath the bore 122 of manifold 116 and its cylinder 44 is in direct registrating relationship with the outlet opening 126 of manifold 116 for receiving the meat products 130 from the bore 122. The pressure behind the meat products 130, forces the meat into the registering cylinder 44 against the face 48 of the piston 46b, thereby moving the latter toward the axis of rotation of tube 14 until the wear plate 52 of piston 46b contacts the uppermost arcuate cam surface 112 of section 80 forming a part of the assembly 76.

While the pistons 46 are preferably mounted for floating, reciprocable movement, it is conceivable that the same could be driven in both directions as the tube 14 rotates. Also, while the pressure of the material 130 is preferably used, other means could be provided within manifold 116 to engage pistons 46 and force the same toward assembly 76.

As the piston 46b moves out of registering relationship with the corresponding outlet opening 126, the material 130 will be sheared away and the patty 128 thereby formed, as shown by the position of the piston 46b in Fig. 4. Scraper 132, acting on patty 128, serves the additional function of re-shaping the same from a generally oval configuration to a generally round formation.

In Fig. 3, piston 46c is shown after the patty 128 thereof has moved away from the arcuate surface 120, and it is to be noted that the wear plate 52 of the piston 46c has moved away from the cam surface 112 along one side of the assembly 76 where the piston 46c is permitted to move inwardly toward the axis of rotation of tube 14. The fact that piston 46c may so move inwardly relieves the captive pressure and avoids the tendency of patty 128 to extrude out of the cylinder 44 as the same leaves the arcuate surface 120.

As the pistons 46 move to a position where the wear plates 52 thereof engage the cam surface 114 of section 78, the patty 128 is ejected from the cylinders 44 in the manner shown in Figs. 3 and 4. In Fig. 3, the piston 46d is directly beneath the assembly 76 and therefore, the patty 128 is completely ejected, and the surface 48 of piston 46d is flush with the outermost face of the tube 14. As the tube 14 continues to rotate, patty 128 will be scraped from the surface 48 of piston 46d by the scraper plate 132 as shown in Fig. 4.

After the pistons 46 clear the cam surface 114, they are again free to move toward and away from the assembly 76 as illustrated by the position of piston 46a in Fig. 3.

Fig. 4 of the drawings shows the piston 46a as it passes beneath the surface 120 toward the outlet opening 126; illustrates a patty 128 between surface 120 and piston 46b within the cylinder 44 of the latter; shows a patty 128 partially ejected from the cylinder 44 of piston 46c by virtue of the action of cam surface 114; and shows a third patty 124 being scraped away from the surface 48 of piston 46d by the blade 132.

While Figs. 3 and 4 of the drawings show but four of the pistons 46, it is understood that eight cylinders are filled with the material 130 simultaneously and that eight patties 128 are scraped away by the plate 132 simultaneously during continuous rotation of the tube 14.

Any suitable receptacle may be provided to receive the patties 128 or the same may be fed directly into cans or other packaging means therefor. In practice, when the machine is used for canning purposes, the patties 128 drop in relatively close, side-by-side relationship upon a continuous conveyor belt that moves the patties to a point of canning while the same are cooked.

Proper synchronization of operation is, of course, necessary and therefore, to assure that the faces 48 of the pistons 46 are flush with the outer surface of the tube 14 during operation of scraper 132, and to assure further that the pistons 46 are properly limited in their inward movement under pressure of the material 132 during filling of the cylinders 44 thereof, the assembly 76 may be adjusted (during operation, if desired) by use of the arm 86. In other words, the positions of both cam surfaces 112 and 114 are altered by re-positioning the bolt 96 along the bar 92, swinging of arm 86 rotating the entire assembly 76 on the longitudinal axis of tube 14.

The thickness of the patty 128 is determined by the position of the section 80 of assembly 76 with respect to the section 78 thereof. And, as above set forth, it is but necessary to manipulate the two rods 106 exteriorly of the tube 14 in order to impart parallel motion to section 80 as desired. When it becomes necessary to remove the pistons 46 from their cylinders 44 for any reason such as cleaning, repair, replacement of the wear plates 52 or the rings 50, the operator need merely depress the four pins 64 against the action of the spring 72 thereof, rotate the pins 270 degrees to place the fingers 68 in the cavity 74, and each time any rod 64 is thus manipulated, eight pistons 46 are forcibly ejected from their cylinders 44. Such ejection results from flat face 66 of the rods 64 moving against beveled face 58 of the plates 52.

It is seen further that the entire machine is easily assembled and dis-assembled. For instance, all of the sections 20, 22 and 24, as well as the end plates 26 and 28, separate upon removal of the tie rods 30, whereupon the assembly 76 may be removed from the pintles 32 and 34.

An extremely advantageous feature of the patty former above set forth is its speed of operation. The number of patties 128 that can be produced per minute through use of the machine, is appreciably more than has heretofore been made possible through use of any type of apparatus heretofore developed. It is furthermore to be noted, that the patties 128 are of uniform size, shape and consistency. They are well packed or compressed into a self-sustaining body without undue hardness, facilitating the packaging thereof and presenting an edible article that is easily handled during cooking or other preparation for eating.

Adjustment while operating, simple ejection of the pistons, and positive movement of the pistons cannot be over-emphasized as important features. The pistons must not catch on the scraper plate 132, yet must completely exude the patty. Precise adjustments can only be made while operating and the machine hereof is so adapted.

While it has been indicated above that the machine is adapted primarily for use by the packing industry, it is appreciated that the same may be used advantageously in restaurants and public eating places generally, to automatically present patties for preparation on a large scale if desired.

The machine is inexpensively manufactured, easy to operate and maintain, requires little operator attention, may be used over long periods of time without the necessity of repair or replacement of parts, and when such replacement becomes necessary, the same may be effected quickly and easily with little expense because of the novel manner of interconnecting the various component parts as above explained.

Having thus described the invention what is claimed as new and desired to be secured by Letters Patent is:

1. In a patty former having a hollow manifold provided with an inlet opening and an outlet opening for passage of patty forming material under pressure, a rotatable tube having a series of cylinders successively registrable with said outlet opening as the tube rotates, and a reciprocable piston in each cylinder respectively and movable therein inwardly toward the axis of rotation of the tube when the cylinders are in register with the outlet opening, under influence of the pressure of material passing from the manifold into the cylinders, a cam assembly for controlling reciprocation of said pistons, said assembly including an elongated, normally stationary, expansible member within the tube and disposed on said axis, said member having a cam surface facing the manifold for successive engagement by the pistons to limit the extent of inward movement of the pistons, and a cam surface facing away from the manifold for successive engagement by the pistons to move the latter outwardly away from said axis to eject the material from the cylinders, said member having a pair of opposed stems rotatable within the tube; and a control rod in each stem respectively for expanding and contracting the member to shift the cam surfaces radially with respect to the axis of rotation of the tube.

2. In a patty former having a hollow manifold provided with an inlet opening and an outlet opening for passage of patty forming material under pressure, a rotatable tube having a series of cylinders successively registrable with said outlet opening as the tube rotates, and a reciprocable piston in each cylinder respectively and movable therein inwardly toward the axis of rotation of the tube when the cylinders are in register with the outlet opening, under influence of the pressure of material passing from the manifold into the cylinders, a cam assembly for controlling reciprocation of said pistons, said assembly including an elongated, normally stationary member within the tube and disposed on said axis, said member having a pair of sections, one section being provided with a cam surface facing the manifold for successive engagement by the pistons to limit the extent of inward movement of the pistons, the other section having a cam surface facing away from the manifold for successive engagement by the pistons to move the latter outwardly away from said axis to eject the material from the cylinders, said one section being shiftable toward and away from the manifold for varying the thickness of the ejected material; structure pivotally interconnecting said sections for rendering the one section shiftable; means holding the one section in adjusted positions relative to the other section; and means mounting the member for rotation relative to the tube and the manifold, whereby to vary the positions of said cam surfaces.

3. In a patty former having a hollow manifold provided with an inlet opening and an outlet opening for passage of patty forming material under pressure, a rotatable tube having a series of cylinders successively registrable with said outlet opening as the tube rotates, and a reciprocable piston in each cylinder respectively and movable therein inwardly toward the axis of rotation of the tube when the cylinders are in register with the outlet opening, under influence of the pressure of material passing from the manifold into the cylinders, a cam assembly for controlling reciprocation of said pistons, said assembly including an elongated, normally stationary member within the tube and disposed on said axis, said member having a pair of sections, one section being provided with a cam surface facing the manifold for successive engagement by the pistons to limit the extent of inward movement of the pistons, the other section having a cam surface facing away from the manifold for successive engagement by the pistons to move the latter outwardly away from said axis to eject the material from the cylinders, said one section being shiftable toward and away from the manifold for varying the thickness of the ejected material; parallel motion structure interconnecting the sections; and movable means engageable with the one section for shifting the same relative to the other section.

4. In a patty former having a hollow manifold provided with an inlet opening and an outlet opening for passage of patty forming material under pressure, a rotatable tube having a series of cylinders successively registrable with said outlet opening as the tube rotates, and a reciprocable piston in each cylinder respectively and movable therein inwardly toward the axis of rotation of the tube when the cylinders are in register with the outlet opening, under influence of the pressure of material passing from the manifold into the cylinders, a cam assembly for controlling reciprocation of said pistons, said assembly including an elongated, normally stationary member within the tube and disposed on said axis, said member having a pair of sections, one section being provided with a cam surface facing the manifold for successive engagement by the pistons to limit the extent of inward movement of the pistons, the other section having a cam surface facing away from the manifold for successive engagement by the pistons to move the latter outwardly away from said axis to eject the material from the cylinders; structure pivotally interconnecting the sections for movement of one of said sections toward and away from the other section whereby to vary the distance between said surfaces; opposed tubular stems on said member mounting the latter for rotation on said axis for varying the position of the cam surfaces of the sections relative to the manifold; and rods reciprocable in the stems and engageable with the one section for holding the same in adjusted positions relative to the other section, the rods engaging the one section at opposite ends thereof and having means for securing the same to the stems.

5. In a patty former having a hollow manifold provided with an inlet opening and an outlet opening for passage of patty forming material under pressure, a rotatable tube having a series of cylinders successively registrable with said outlet opening as the tube rotates, a reciprocable piston in each cylinder respectively and movable therein inwardly toward the axis of rotation of the tube when the cylinders are in register with the outlet opening, under influence of the pressure of material passing from the manifold into the cylinders, and a cam assembly in the tube for controlling reciprocable movement of the pistons, structure for limiting the extent of outward movement of the pistons relative to the axis of rotation of the tube, said structure including a pin extending through each cylinder respectively and carried by the tube, each pin having a shoulder, said pistons each being provided with a pin-receiving recess; and stops on the pistons engageable with said shoulders upon outward movement of the pistons.

6. In a patty former having a hollow manifold provided with an inlet opening and an outlet opening for passage of patty forming material under pressure, a rotatable tube having a series of cylinders successively registrable with said outlet opening as the tube rotates, a reciprocable piston in each cylinder respectively and movable therein inwardly toward the axis of rotation of the tube when the cylinders are in register with the outlet opening, under influence of the pressure of material passing from the manifold into the cylinders, and a cam assembly in the tube for controlling reciprocable movement of the pistons, structure for limiting the extent of outward movement of the pistons relative to the axis of rotation of the tube, said structure including a pin extending through each cylinder respectively and carried by the tube, each pin having a shoulder, said pistons each being provided with a pin-receiving recess; and stops on the pistons engageable with said shoulders upon outward movement of the pistons each pin being rotatable in the tube for movement of the shoulders thereof out of the cylinders to permit removal of the pistons, there being releasable means normally holding the pins against rotation relative to the tube.

References Cited in the file of this patent

UNITED STATES PATENTS

| | | |
|---|---|---|
| 477,060 | Nirdlinger | June 14, 1892 |
| 483,663 | Warren | Oct. 4, 1892 |
| 888,412 | Thomson | May 19, 1908 |
| 1,272,073 | Majewski | July 9, 1918 |
| 1,473,590 | Wallace | Nov. 6, 1923 |
| 1,550,617 | Kellerman | Aug. 18, 1925 |